G. E. STARN.
VEHICLE TIRE.
APPLICATION FILED NOV. 20, 1909.
1,014,345.
Patented Jan. 9, 1912.
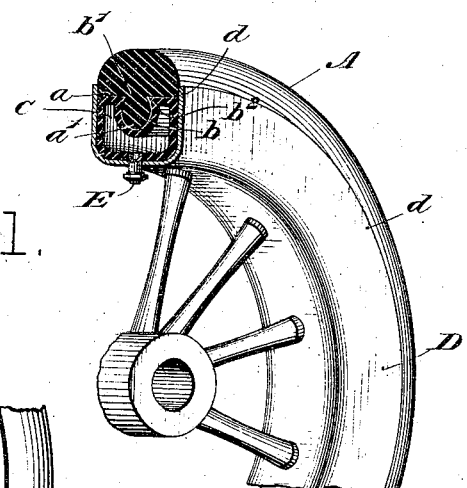
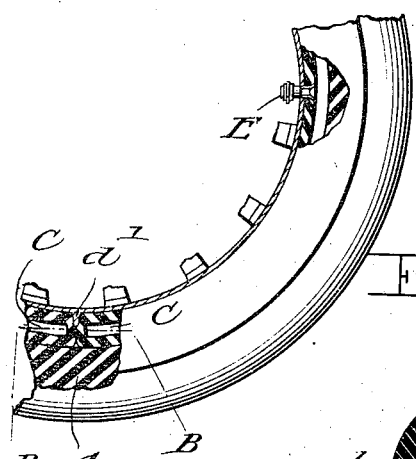
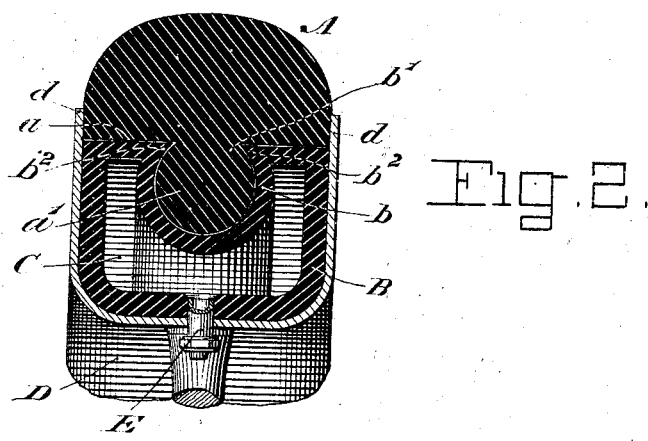
WITNESSES
INVENTOR

UNITED STATES PATENT OFFICE.

GEORGE E. STARN, OF CAMDEN, NEW JERSEY, ASSIGNOR TO HANNAH M. DOVER, OF PALMYRA, NEW JERSEY.

VEHICLE-TIRE.

1,014,345.  Specification of Letters Patent.  Patented Jan. 9, 1912.

Application filed November 20, 1909. Serial No. 529,147.

*To all whom it may concern:*

Be it known that I, GEORGE E. STARN, a citizen of the United States, residing at Camden, in the county of Camden and State of New Jersey, have invented certain new and useful Improvements in Vehicle-Tires, of which the following is a specification.

This invention relates to tires for vehicle wheels, and more particularly to pneumatic cushion tires for automobiles, carriages, bicycles and other vehicles on which it is desirable to use tires possessing a certain amount of elasticity or yielding properties, and has for its object the provision of a simple, inexpensive and efficient pneumatic cushion tire that will contribute to the ease and comfort of the occupant of the vehicle, and relieve the machinery of the latter from strain, jar, wear and tear, and which will not be susceptible to puncture.

A further object is to provide a wheel-tire of the character referred to having a solid broad tread overlying a correspondingly broad and soft or yielding member and an interlocking connection between the two members, whereby air-pressure within the yielding member will exert itself in binding the two members inseparably together, under the varying conditions of use, and when subjected to severe strains tending to draw, pull or force the outer member or tread off of the inner portion or rim of the wheel.

The invention will first be hereinafter more particularly described, with reference to the accompanying drawings, which are to be taken as a part of this specification, and then pointed out in the claims at the end of the description.

Figure 1 of said drawings represents a perspective view of a portion of a wheel having a pneumatic cushion tire thereon embodying my invention, and Fig. 2 is a transverse section of the same, on enlarged scale. Fig. 3 is a vertical section cutting off one side of the rim of the wheel, and showing the yielding member formed of two parts, each extending half way around the rim, means being shown also for preventing the tire from creeping around the rim, and portions of the tire being broken away.

In said drawings, in which the same reference letters are used to denote corresponding parts in different views, the letter A may denote the tread or male member of a vehicle-wheel tire which is preferably composed of hard rubber and has a broad base $a$, and a projection $a^1$ extending around the inner side thereof and preferably substantially circular in cross-section.

The letter B denotes the inner portion or female member of the tire, having a tubular portion or socket $b$ which extends longitudinally of the tire and is shown circular in cross section. The socket $b$ is provided with a narrow opening $b^1$ extending along the outer side thereof and adapted to receive said projection $a^1$, and also having an air chamber C therein, which extends around said tubular portion or socket $b$ to the opposite sides of said opening $b^1$ so as to adapt the air pressure within said air chamber to compress the socket portion of the female member around said projection $a^1$ and thereby clench and firmly secure the two members together without other fastening means.

In the form shown, the female-member B is virtually a tube within a tubular portion which is substantially rectangular in cross-section, said tube having a longitudinal slot opening therein from the outer side of said rectangular portion, and the latter is seated within and upon a substantially U-shaped rim D, preferably of steel, the sides $d$ of which may extend past the junction of the outer and inner members of the tire so as to provide a housing for the female member and an abutment at each side of the male member. Though preferably composed of hard metal or steel, other material may be used for the rim, and other forms employed, the form shown being simply a serviceable and preferred construction.

For the purpose of inflating the hollow flexible female member, a valved air-tube or nipple E, such as ordinarily employed on pneumatic tires, may be inserted through registering openings in the rim and inner portion of said female member, as shown, or in any desired manner, to permit the introduction of air into said air chamber C by means of a force pump.

The tire thus constructed, after inflation of the female member, will constitute to all intents and purposes a practically integral structure, having a solid non-puncturable outer portion and a soft or yielding inner portion, incapable of separation so long as the air pressure within the inner member is maintained, regardless of the conditions of use, which often result in the withdrawal of the outer members of inflatable tires, as heretofore constructed, through friction, sliding, concussion, explosion, or engagement with the rails and slots of street railways and the like. As will be seen, the construction of the female member is such as to provide as it were claws $b^2$ along the margins of the slot in the tube $b$ fitting into the recess at the neck of the projection on the male member, so as to adapt the air pressure within the air chamber to force said claw-like portions of the material of said tubular portion into the recesses about the neck of said projection and clench the same, thereby firmly and securely binding and holding the two members together without danger of separation. The outer or male member is preferably composed of hard rubber and is solid, and the inner member is preferably composed of soft rubber, though any other suitable material possessing sufficient resiliency or flexibility may be employed. It will also be observed that the tread of the tire has a broad substantially flat base seated on a correspondingly broad and flat yieldable inflatable portion, and that the latter is protected against puncture by the outer solid or hard rubber tread and by the surrounding hard metal rim, thus meeting all of the requirements for safety and comfort and avoiding the liability to accidents such as are caused from puncture or the bursting of a tire. The form of the tread and female member of the tire also adapts the latter to act as a full bow-spring, rather than a half bow-spring, and adapts it under almost every conceivable condition to relieve the strain and jar on the machinery of the vehicle and to avoid the wear and tear, while contributing to the comfort and security of the occupants of the automobile or other vehicle on which such tires are used.

The female tire may be integral or cut, and I preferably make it in two equal parts or semi-circles, thus providing four ends. This will lessen the expense of manufacture and facilitate adjustment of the tire, and by placing a projection $d^1$ upon the rim at the break of the two semi-circles the female tire will be prevented from creeping, and thus save damage to the air valve which is caused by creeping of tires. It is also less expensive to replace one of the parts instead of a whole female tire in event of accident or injury to the tire or valve.

Having thus described my invention what I claim as new and desire to secure by Letters Patent is:

1. An air cushioned tire comprising a hollow flexible female member having a socket therein open along its outer side and an air chamber within said member extending around said socket to opposite sides of the opening therein, and a male member having a broad substantially flat base seated on said correspondingly shaped outer side of said female member and provided with a projection fitted in said socket and adapted to be retained therein by air pressure within said chamber causing said female member to clench and hold said projection.

2. An air cushioned tire comprising a hollow flexible female member having a longitudinally extending and substantially circular socket therein open along its outer side, said side being broad and substantially flat, and a male member of hard rubber having a broad substantially flat base seated on said flat side and provided with a substantially circular projection fitting into said socket and adapted to be retained therein by air pressure within said chamber clenching the material of the socket around said projection.

3. An air cushioned tire comprising a tread and a substantially rectangular and inflatable portion, the tread and inflatable portion being substantially coextensive in width and being interlocked by having a portion of one entered into a socket of the other and held therein by the inflation of said inflatable portion.

4. The combination with an air cushioned tire comprising a solid tread having a projection and an inflatable portion having a socket engaged by said projection, the tread and inflatable portion being substantially coextensive in width, and being substantially rectangular in cross section, and a wheel rim embracing the inflatable portion and forming a housing for the air chamber thereof.

5. The combination with an air cushioned tire substantially rectangular in cross section and comprising a non-puncturable tread and an inflatable portion, the tread and inflatable portion being interlocked by a portion of one being entered into a socket of the other, the inflation of the inflatable portion locking it and the tread together, and a substantially U-shaped rim embracing the inflatable portion and extending beyond its juncture with the tread and housing the air chamber of the inflatable portion and overlying the sides of the tread.

In testimony whereof I affix my signature, in presence of two witnesses.

GEORGE E. STARN.

Witnesses:
H. RICHARDSON,
CHARLES B. WALKER.